April 8, 1969 D. W. ROPER 3,437,186
SPEED RESPONSIVE CLUTCH
Filed June 3, 1966 Sheet 1 of 2

INVENTOR
DANIEL W. ROPER
BY Hoffmann and Yount
ATTORNEYS

April 8, 1969  D. W. ROPER  3,437,186
SPEED RESPONSIVE CLUTCH
Filed June 3, 1966  Sheet 2 of 2

INVENTOR
DANIEL W. ROPER
BY Hoffmann and Yount
ATTORNEYS

United States Patent Office 3,437,186
Patented Apr. 8, 1969

3,437,186
SPEED RESPONSIVE CLUTCH
Daniel W. Roper, Rochester, Mich., assignor to Eaton Yale & Towne Inc., Cleveland, Ohio, a corporation of Ohio
Filed June 3, 1966, Ser. No. 555,103
Int. Cl. F16d *13/04, 41/00, 43/00*
U.S. Cl. 192—35     17 Claims

ABSTRACT OF THE DISCLOSURE

Disclosed herein is a drive mechanism for interconnecting driving and driven members. The drive mechanism includes a clutch assembly which is operated from a disengaged position to an engaged position by an expansible chamber assembly. The axpansible chamber assembly is responsive to a predetermined slip speed between the driving and driven members to operate the clutch assembly to drivingly interconnect the driving and driven members upon the occurrence of the predetermined slip speed between the driving and driven members.

---

This application is entitled to the benefit of the filing date of copending application Ser. No. 347,837, filed Feb. 27, 1964 and now U.S. Patent No. 3,300,002 for all subject matter in this application which is common therewith.

The present invention relates in general to drive mechanisms and more particularly to drive mechanisms, such as limited slip differentials, having rotatable driving and driven members drivingly connected at a predetermined slip speed therebetween by a clutch means.

An object of the present invention is the provision of a new and improved drive mechanism having a clutch means movable to drivingly connect rotatable driving and driven members and fluid pressure actuated means for moving the clutch means into a position for drivingly connecting the driving and driven members at a predetermined slip speed between the members.

Another object of the present invention is the provision of a new and improved drive mechanism having rotatable driving and driven members adapted to be drivingly connected by a clutch means and wherein the clutch means is moved to drivingly connect the members by the action of an expansible chamber fluid operated device with movement of the clutch means into engagement with the members being effected by the expansible chamber device at a predetermined speed of relative rotation between the members.

Another object of the present invention is the provision of a new and improved drive mechanism of the type set forth in the next preceding paragraph wherein the expansible chamber device is associated with a pump means for providing a fluid presure therein to effect movement of the clutch means and which includes surfaces which are relatively movable to provide a high pressure fluid and wherein the clearance between the surfaces may be controlled to control the relative speed between the members at which they are drivingly connected.

A further object of the present invention is the provision of a new and improved drive mechanism having rotatable driving and driven members drivingly connected at a predetermined slip speed therebetween by a clutch means, and wherein the clutch means in its disengaged position is carried by one of the members and is moved to drivingly connect the members by movement of a part thereof in a direction along the axis of rotation of the members and circumferentially relative to the members.

Another object of the present invention is the provision of a new and improved drive mechanism having rotatable driving and driven members and clutch means therebetween for drivingly connecting the driving and driven members upon a predetermined amount of relative rotation therebetween and with the clutch means moved to drivingly connect the members in response to actuation by an expansible chamber fluid operated device, and wherein the clutch means is movable in a direction along the axis of rotation of the driving and driven members by the fluid device and circumferentially relative to the members to effect driving engagement therebetween by frictional engagement with a surface portion of one of the members.

Other objects and advantages of the present invention will become apparent from a consideration of the detailed description of a preferred embodiment thereof which follows and from the drawings which form a part of the specification and in which.

The present invention provides a new and improved drive mechanism having relatively rotatable members and clutch means for drivingly connecting the members in response to relative rotation therebetween, the clutch means being urged into driving relation with the members by an expansible chamber fluid operated device operable in response to relative rotation between the members.

Figures 1, 2:
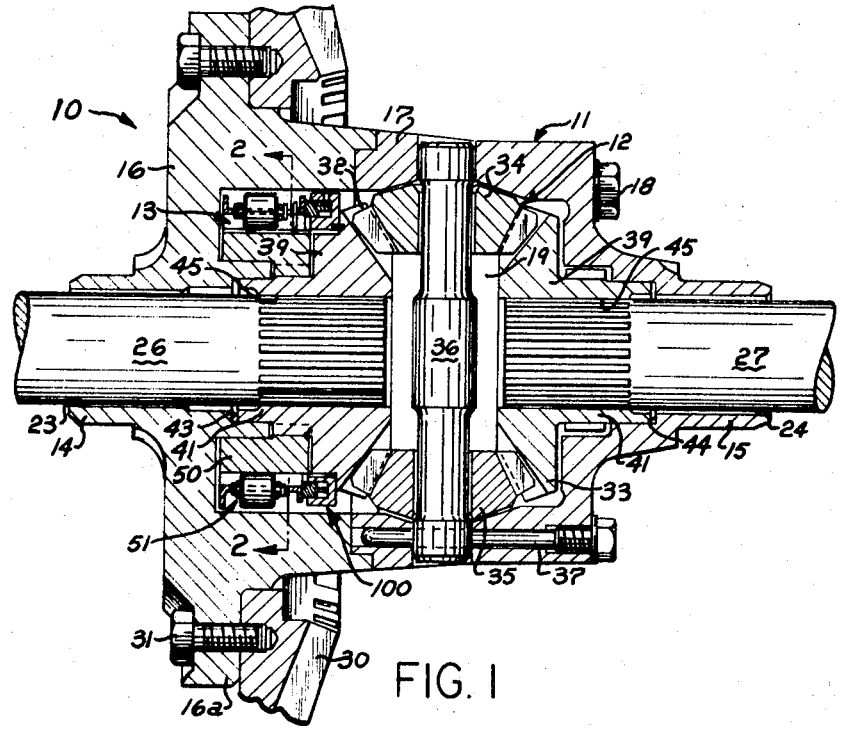
FIG. 1 is an axial sectional view of a differential drive mechanism embodying the present invention.
FIG. 2 is a sectional view of the differential drive mechanism taken approximately at line 2—2 of FIG. 1.
Figure 3:
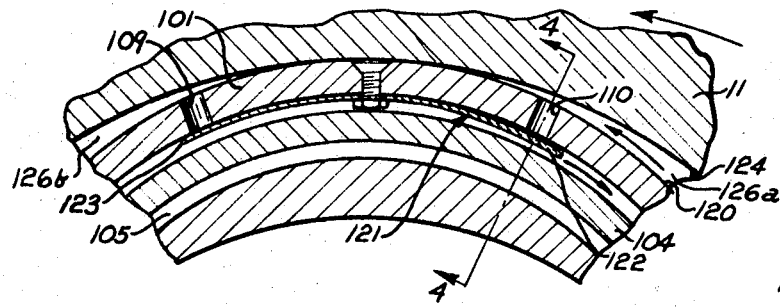
FIG. 3 is a sectional view of the drive mechanism taken approximately at line 3—3 of FIG. 4.
Figure 4:
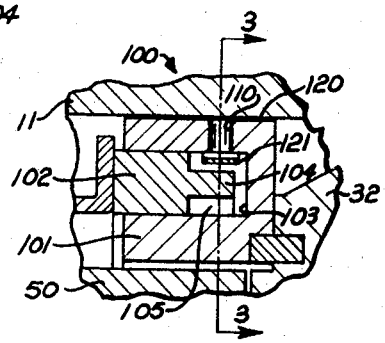
FIG. 4 is a sectional view taken approximately at line 4—4 of FIG. 3.

As representing the preferred embodiment of the present invention, a differential drive mechanism 10 is illustrated in FIG. 1 and is especially suitable for use in driving the wheels of a vehicle. The differential drive mechanism 10 comprises, in general, a rotatable planet gear carrier 11, a differential gear train 12, and a clutch mechanism 13 operable to retard rotation of one of the gears of the gear train 12 relative to the planet gear carrier 11.

The planet gear carrier 11 includes a pair of support portions 14 and 15 adapted to be received in bearings of a supporting structure, such as an axle housing, not shown, by which the carrier 11 is rotatably supported. The carrier 11 includes a pair of members 16 and 17 which are suitably secured together by means of suitable screws 18, and which define a chamber 19 in which the gear train 12 and the clutch means 13 are located. The support portions 14, 15 of the planet gear carrier 11 are formed on opposite portions of the members 16, 17, respectively, and are provided with openings 23, 24, respectively, extending therethrough. The openings 23, 24 are disposed in an aligned relation on a common axis which is also the rotational axis of the carrier 11. The axial openings 23, 24 communicate with the chamber 19 and receive or accommodate the driven or power output means which are here represented by axle shafts 26, 27, respectively, whose outer ends are connected with traction wheels, or the like, not shown, and whose inner or adjacent ends are connected with the gear train 12, as will be described hereinbelow.

The differential mechanism 10 includes a conventional ring gear 30 extending around and mounted on the carrier 11 by means of connecting screws 31 which extend through a flange portion 16a of the member 16 which forms a part of the planet carrier 11. A suitable drive pinion, not shown, meshes with the ring gear 30 and represents the power input means for the differential mechanism 10 and upon rotation effects rotation of the ring gear 30, and rotation of the ring gear 30, of course, effects rotation of the planet carrier 11.

The gear train 12 is operable to transmit the rotary motion of the planet carrier 11 to the output shafts 26, 27. The gear train 12 comprises a pair of beveled type side gears 32, 33 and a group of beveled pinion planetary gears, in this case two such gears 34, 35, disposed between and in meshed engagement with the side gears 32, 33 for drivingly connecting the latter. The planetary gears 34, 35 are rotatably supported by the carrier 11 by means of a pinion shaft 36 extending across the gear chamber 19 and secured in the casing by a suitable anchor pin 37 extending through the pinion shaft transversely thereof.

The side gears 32, 33 and the pinion gears 34, 35 are, in the preferred embodiment, all bevel gears of conventional form as far as the teeth thereof are concerned, and the tooth profiles are of a conventional shape having pressure angle value coming within the usual range of such values. The side gears 32, 33, while in the preferred embodiment, comprise bevel gears, may take other known forms and each of the gears 32, 33 comprises an annular body 39 having teeth formed thereon and a central hollow sleeve or hub 41 connected with the body and extending coaxially with the axis of rotation of the side gears. The carrier 11 is provided with hollow annular or axial sockets 43, 44 into which the hub portions 41 of the gears 32, 33, respectively, extend and which rotatably receive the gears. The gears 32, 33 are provided with splines 45 in the hub openings thereof which are engaged by corresponding splines formed on the inner ends of the axle shafts 26, 27, respectively, for drivingly connecting each shaft with the side gears.

The clutch means 13 is a double overrunning clutch operable to retard relative rotation of the side gear 32 with respect to the planet carrier 11. The clutch means 13 acts between the planet carrier and a member 50 drivingly connected with the side gear 32. The member 50 comprises an annular sleeve member which has an opening therethrough and is internally splined at 53 and supported on the hub portion 41 of the gear 32 with the splines 53 thereof cooperating with splines on the outer portion of the hub 41 of the gear 32. The member 50, as a result of its spline connection to the hub portion 41 of the gear 32, rotates with the gear 32. The outer surface of the member 50 includes a plurality of substantially flat surface areas 60 extending therearound and at diametrically opposite portions thereof has grooves 61 and 62 formed therein. The grooves 61 and 62 are V-shaped grooves of only a slight depth.

The clutch means 13 includes a roller cage mechanism 51 which comprises a shiftable roller cage 65 and a plurality of rollers 66 supported by the shiftable roller cage 65 and corresponding in number to the number of flat surface areas on the member 50 plus the number of grooves 61, 62. The rollers 66 are located in openings 67 in the roller cage and upon shifting movement of the roller cage in a circumferential direction relative to the member 50, the rollers, of course, move circumferentially with the roller cage. The openings 67 in the cage 65 are substantially axially longer than the rollers 66 for a purpose to be described hereinafter. The rollers 66 engage the surface areas 60 of the member 50 and two rollers, namely 66a and 66b, are located in the V-grooves 61, 62, respectively.

The roller cage 65 is circumferentially shiftable or movable, as noted above, from a position shown in FIG. 2 wherein the rollers 66 permit relative rotation of the side gear and planet carrier 11 to a postion wherein the rollers 66 wedgingly engage surface areas 60 of the member 50 and the arcuate surface 70 of the differential housing member 16. When the rollers are wedgingly engaged with these surfaces, the planet carrier 11 is drivingly connected to the sleeve member 50 which in turn is drivingly connected to the side gear 32, and in this position relative movement between the side gear 32 and the carrier 11 is prevented.

Figure 6:
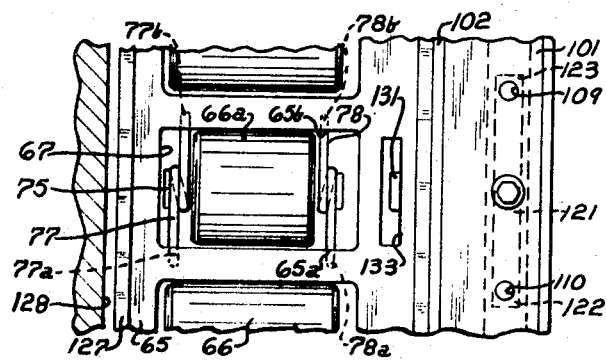
FIG. 6 is a sectional view taken approximately at line 6—6 of FIG. 5.
Figure 5:
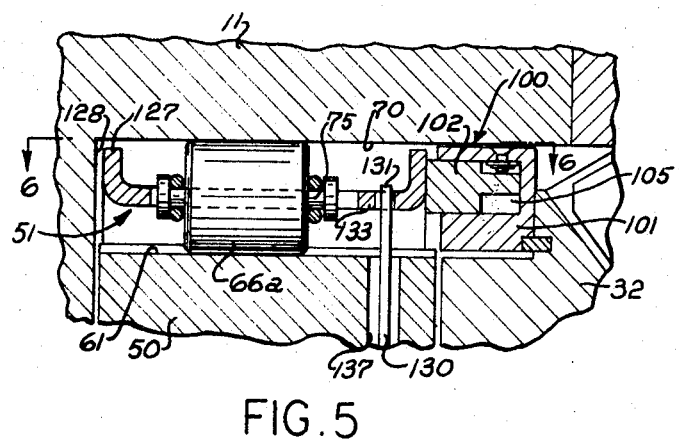
FIG. 5 is a fragmentary sectional view of a portion of the mechanism of FIG. 1 on an enlarged scale.

A suitable means is provided for yieldably holding the roller cage mechanism 51 in a centered or neutral position, and in the embodiment shown a biasing means is provided for biasing the rollers 66 and the roller cage 65 into a centered or neutral position wherein the rollers 66 are not drivingly connecting the carrier 11 and the side gear 32. The biasing means may take different forms, but as shown in FIGS. 2 and 6 includes a spring detent roller arrangement which includes the rollers 66a and 66b. The rollers 66a, 66b include stem portions 75. The stem portions 75 extend axially outwardly of the rollers 66a and 66b, respectively, as best shown with respect to roller 66a in FIG. 5. Encircling the opposite stem portions 75 are spring members 77, 78, respectively. The spring members encircle the opposite stem portions of the roller 66a and the opposite ends of the springs, namely 77a and 77b, and 78a and 78b engage portions 65a, 65b of the roller cage adjacent the openings in the roller cage in which the roller 66a is located.

From the above description, it should be apparent that as the roller 66a tends to move out of the V-groove 61, the roller 66a tends to rise and the ends of the springs 77, 78 will resist movement of the roller upwardly or radially out of the V-groove and tend to hold the roller at the bottom thereof. Of course, once the force applied by the springs 77, 78 is overcome, the roller 66a will tend to move out of the V-groove 61 and permit circumferential shifting of the roller cage 65 so that the rollers 66 carried thereby move into driving engagement with the surfaces 60 and 70 on the members 50 and 16, respectively. The rollers 66a and 66b do not transmit driving torque between the planet carrier 11 and the sleeve member 50.

From the above description, it should be apparent that the roller mechanism 51 is biased into a centered position where it does not drivingly engage the member 50 and the differential gear casing 11. However, it may be moved circumferentially into driving engagement against the bias of the springs by actuating means which includes a fluid pressure actuated means in the form of an expansible chamber fluid operated device, generally indicated at 100.

The expansible chamber device is effective to move the roller mechanism to drivingly connect the member 50 and casing 11 at a substantially constant predetermined relative speed therebetween. The expansible chamber device 100 includes a generally annular body member 101 mounted on the side gear 32 and an annular piston member 102 snugly and slidably disposed in an annular axially opening groove 103 formed in the body member 101. The piston 102 is free to rotate so as not to apply a holding force on the cage during engagement. The piston 102 includes an annular flange 104 which abuts the bottom of the groove 103 to limit movement of the piston 102 toward its retracted position. An expansible chamber 105 is formed in the groove 103 between the piston 102 and body member 101. When fluid enters the groove 103 between the piston member 102 and body member 101, the piston member 102 moves axially relatively to the body member 101.

Fluid is delivered to the groove 103 through ports or orifices 109 and 110 formed in the outer periphery of the body member 101. The ports 109, 110 extend between an outer peripheral surface 120 of the body member 101 and the chamber 105 and cooperate with valve means 121 positioned in the chamber 105 and which extends across the ports 109, 110. The valve means 121 permits fluid flow into the chamber 105 through the ports 109, 110, as will be presently described, while preventing flow of fluid from the chamber 105 outwardly through the ports. In the illustrated and preferred embodiment, the valve means 121 is a reed valve connected to the body member 101 by a suitable fastener, such as a screw. The reed valve 121 is symmetrical about its fastener and includes end portions 122, 123 which extend across the ports 109, 110 to prevent the flow of fluid outwardly therethrough. The valve 121 could be of any suitable construction which would provide substantially one-way flow through the ports 109, 110.

The body 101 is mounted on the side gear 32 with the surface 120 of the body 101 lying adjacent a surface 124 formed on the inner periphery of the planet carrier 11. The surface 120 converges toward the surface 124 on the periphery of the body 101 to a point closely adjacent the planet carrier 11 so that the converging surfaces define pumping wedge-shaped chambers 126a, 126b therebetween. Upon rotation of the planet carrier 11 relative to the body 101, in a counterclockwise direction, as illustrated, fluid is carried around the inner periphery of the planet carrier 11 and forced into the pumping wedge chamber 126a formed between the converging surfaces 120 and 124. The pressure of the fluid in the pumping chamber 126a is, of course, increased in proportion to the speed of relative rotation between the side gear 32 and the carrier 11, as well as the clearance therebetween. The pressure in the chamber 126a in fact varies as the square of the distance between the surfaces 120, 124. By providing the desired clearance between these surfaces the relative speed at which the member 50 and casing 11 are drivingly connected may be readily controlled.

When the pressure of the fluid in the pumping chamber 126a is sufficient to overcome the bias of the end portion 122 of the reed valve 121, fluid flows into the chamber 105 of the expansible chamber device 100 through the port 110. Flow of fluid into the chamber 105 causes movement of the piston 102 axially of the member 101 and moves the roller cage mechanism 51 to drivingly connect the carrier 11 and side gear 32. More specifically, the piston 102 urges the roller cage 65 in a direction generally along the axis of rotation of the side gear 32. Movement of the cage member 65, as described, moves a flange member 127 of the roller cage 65 into frictional engagement with a surface 128 on the carrier 11. Engagement between the flange 127 on the cage 65 and the surface 128 on the carrier 11 causes relative movement between the cage 65 and the side gear 32 due to the frictional drag on the cage 65. In this manner, the cage 65 is effective to move the rollers 66 circumferentially into engagement between the surfaces 60 on the sleeve member 50 and the surface 70 on the carrier 11 as described above.

When the carrier 11 rotates in a clockwise direction relative to the body member 101, fluid is urged into the pumping wedge chamber 126b. When the pressure of the fluid in the chamber 126b is sufficient to overcome the bias of the end portion 123 of the valve 121, the fluid flows into the chamber 105 through the port, or orifice, 109 to move the piston 102 and drivingly connect the carrier 11 and the side gear 32 as described above.

Movement of the roller cage 65 in an axial direction along the axis of rotation of the carrier 11 and side gear 32 is resisted by a leaf spring 130 having an end 131 extending through an elongated slot 133, in the roller cage 65. The leaf spring 130 is suitably positioned in a radial opening 137 extending through the sleeve member 50. The spring 130 is effective to resist engagement between the flange member 127 of the roller cage 65 and the surface 128 on the carrier 11 until a predetermined pressure is achieved in the chamber 105. This predetermined pressure is developed as a result of relative speed between the carrier 11 and side gear 32 and the clearance between the surfaces 120, 124 is mentioned previously. When the predetermined pressure has been developed, the bias of the spring 130 is overcome and the cage 65 is moved as described.

The spring 130 additionally acts as a return spring for returning the roller cage axially toward the device 100 when the clutch 13 is disengaged from between the carrier 11 and side gear 32. As the spring 130 returns to cage member 65 in an axial direction as described, the piston member is moved into the chamber 105 and suitable means is provided for exhausting fluid from the chamber 105 during such movement of the piston member. The elongated slot 133 is operative to permit circumferential movement of the cage member 65 relative to the spring 130 without circumferential deflection of the end 131 thereof.

In the illustrated embodiment, the expansible chamber device 100 is fixedly secured to the side gear 32. However, the device 100 can be constructed from a material having a relatively high coefficient of thermal expansion. When the device 100 is constructed of such a material, the surface 120 will move toward and away from the surface 124, formed on the planet carrier 11, in response to temperature changes. Where such a material is used for construction of the device 100 the body member 101 is connected to the side gear 32 by conventional connecting means which permits radial expansion and contraction of the device 100 relative to the side gear 32 in response to temperature changes. Radial expansion and contraction of the device 100 compensates for changes in viscosity of the fluid contained between the surfaces 120 and 124, in response to temperature changes, and tends to aid in obtaining engagement of the clutch 13 between the carrier 11 and side gear 32 at a relatively constant predetermined speed regardless of temperature changes of the fluid. Materials having a high coefficient of expansion such as aluminum, copper or brass are preferred in the construction of the device 100, however, certain plastic materials are suitable for this use.

It can now be seen that a new and improved drive mechanism has been provided which includes rotatable input and output members having a clutch means therebetween and which is movable into driving engagement between the members in a direction along the axis of rotation of the members by an expansible chamber fluid operated device.

Although a preferred embodiment of the present invention has been described herein in considerable detail, the invention is not to be considered to be limited to the structure shown and described. It is my intention to cover thereby all adaptations, modifications and uses of the present invention coming within the scope of the appended claims.

Having described my invention, I claim:

1. A drive mechanism comprising driving and driven members, clutch means mounted for rotation with one of said driving and driven members, said clutch means being circumferentially movable relative to said one member between a disengaged position providing for rotation of said driving and driven members relative to each other and an engaged position wherein said clutch means drivingly connects said members for rotation at a common speed, biasing means urging said clutch means toward said disengaged position, actuating means for providing a fluid pressure which increases as a function of increasing slip speed and for cooperating with said clutch means to effect circumferential movement of said clutch means to said engaged position, said actuating means being responsive to a predetermined slip speed between said members for moving said clutch means cirnumferentially relative to said one member to said engaged position to effect a driving connection between said clutch means and the other of said driving and driven members upon the occurrence of said predetermined slip speed and to enable relative rotation to occur between said members at slip speeds below said predetermined slip speed, said actuating means including expansible chamber means cooperating with said clutch means to effect the circumferential movement of said clutch means to said engaged condition upon the provision of a fluid pressure corresponding to said predetermined slip speed, said expansible chamber means being nonresponsive to fluid pressures below the fluid pressure corresponding to said predetermined slip speed to enable said clutch means to remain in the disengaged position at slip speeds below said predetermined slip speed.

2. A drive mechanism as defined in claim 1 wherein said expansible chamber means includes a piston element engageable with said clutch means in response to the occurrence of said predetermined slip speed and operable to move said clutch means into said position for drivingly connecting said members at said predetermined speed.

3. A drive mechanism as defined in claim 2 wherein said expansible chamber means includes a generally annular body forming a chamber and said piston element is an annular member snugly disposed in said body and movable relative thereto into engagement with said clutch means.

4. A drive mechanism as defined in claim 1 and further including valve means cooperating with said expansible chamber means and operable to permit flow of a fluid into said expansible chamber means to expand said expansible chamber means in response to relative rotation between said driving and driven members.

5. A drive mechanism as defined in claim 1 wherein said expansible chamber means includes a chamber and a port communicating said chamber with a volume of fluid, and further including valve means cooperating with said port, said valve means operable to pass fluid through said port and into said chamber and to prevent flow of said fluid through said port from said chamber.

6. A drive mechanism as defined in claim 1 wherein said expansible chamber means and one of said members are relatively rotatable at speeds below said predetermined slip speed and said actuating means includes pumping surfaces on said expansible chamber means and the other of said members respectively.

7. A drive mechanism as defined in claim 6 wherein one of said pumping surfaces is movable relative to another of said pumping surfaces in response to temperature changes to compensate for changes is viscosity of said fluid due to said temperature changes with said driving and driven members being drivingly connected substantially at said predetermined slip speed regardless of temperature.

8. A drive mechanism as set forth in claim 1 wherein said expansible chamber means includes an assembly defining an expansible chamber, said actuating means including pump means in conjunction with said expansible chamber for providing for an increase in the fluid pressure in said expansible chamber as the speed of relative rotation between said members increases, said expansible chamber being responsive to the fluid pressure therein upon the occurrence of said predetermined slip speed between said members to thereby operate said clutch means.

9. A drive assembly as set forth in claim 1 wherein said expansible chamber means includes an assembly defining a fluid chamber which is expansible to operate said clutch means from said disengaged position to said engaged position, said actuating means including pump means which is connected for fluid communication with said fluid chamber for increasing the fluid pressure in said fluid chamber as the rate of relative rotation between said members increases, said fluid chamber being expanded by the fluid pressure therein upon the occurrence of said predetermined slip speed between said members to thereby operate said clutch means from said disengaged position to said engaged position.

10. A drive mechanism comprising rotatable driving and driven members, clutch members operatively related with said driving and driven members and movable between a first disengaged position providing for rotation of said members relative to each other and a second engaged position wherein said clutch members drivingly connect said driving driven members for rotation at a common speed, actuating means operatively associated with said driving and driven members and said clutch members for effecting movement of said clutch members in a direction along the axis of rotation of one of said driving and driven members, and means for circumferentially moving said clutch members relative to the driving and driven members after axial movement of said clutch members to move said clutch members to said second engaged position to thereby drivingly connect said members for rotation at a common speed, said actuating means being operative to exert an axially directed force on said clutch members, said force increasing with increases in speed of relative rotation between said driving and driven members and effective at a predetermined speed of relative rotation between said driving and driven members to move said clutch members axially along said axis of rotation.

11. A drive mechanism as defined in claim 10 and further including spring means associated with said clutch members and operable to resist movement of said clutch members in said axial direction at speeds of relative rotation between said driving and driven members below said predetermined speed.

12. A drive mechanism comprising rotatable driving and driven members, clutch members operatively related with said driving and driven members and movable between a first disengaged position providing for rotation for said members relative to each other and a second engaged position wherein said clutch members drivingly connect said driving and driven members for rotation at a common speed, actuating means operatively associated with said driving and driven members and said clutch members for effecting movement of said clutch members in a direction along the axis of rotation of one of said driving and driven members, and means for circumferentially moving said clutch members relative to the driving and driven members after axial movement of said clutch members to move said clutch members to said second engaged position to thereby drivingly connect said members for rotation at a common speed, said means for moving said clutch members circumferentially having a radially extending flange portion connected to said clutch members and a surface thereon which frictionally engages a surface on said one of said driving and driven members when said clutch members move in said axial direction, said frictional engagement between said flange portion and said one member being effective to move said clutch members circumferentially relative to said driving and driven members.

13. A drive mechanism as defined in claim 12 wherein said actuating means includes a chamber expansible in response to increases in pressure of a fluid therein, said fluid pressure increasing in response to increases in relative rotation between said driving and driven members and effecting movement of a part of said actuating means to move said clutch members in said axial direction.

14. A drive mechanism as defined in claim 13 wherein said part of said actuating means comprises a piston member cooperating with said chamber and movable in said axial direction toward said clutch means to effect movement of said part thereof.

15. A drive mechanism as defined in claim 12 wherein one of said rotatable members forms part of a power input means and the other of said rotatable members forms part of a power output means driven by said input means and further including a second output means driven by said input means, differential gear means between said driven output means, said differential gear means including first and second side gears secured to said first and second output means, and at least one planetary gear connected to said input means and meshing with said side gears to drive the same.

16. A drive mechanism comprising driving and driven members, clutch means operatively associated with said driving and driven members and movable between a first disengaged position providing for rotation of said driving and driven members relative to each other and a second engaged position wherein said clutch means drivingly engages said members for rotation at a common speed, biasing means urging said clutch means toward said disengaged position, and expansible chamber actuating means operatively associated with said members and said clutch means and operable at a predetermined slip speed between said members to move said clutch means into a position for drivingly connecting said members, said expansible chamber means including first and second ports for communicating a chamber of said expansible chamber means with a volume of fluid, and further including valve means cooperating with said ports, said valve means being operable to permit fluid flow into said chamber through said ports and to prevent fluid flow from said chamber through said ports, said valve means including a first port operative to permit fluid flow into said chamber through one of said ports upon rotation in one direction of one of said members relative to the other member at said predetermined speed and a second part effective to permit fluid flow into said chamber through said other port upon rotation of said one of said members relative to said other member in an opposite direction at said predetermined speed with said fluid flowing into said chamber effective to expand said chamber and move said clutch means.

17. A drive mechanism comprising driving and driven members, clutch means operatively associated with said driving and driven members and movable between a first disengaged position providing for rotation of said driving and driven members relative to each other and a second engaged position wherein said clutch means drivingly engages said members for rotation at a common speed, biasing means urging said clutch means toward said disengaged position, and expansible chamber actuating means operatively associated with said members and said clutch means and operable at a predetermined slip speed between said members to move said clutch means into a position for drivingly connecting said members, said expansible chamber means including a port communicating a chamber of said expansible chamber means with a volume of fluid, and further including valve means coperating with said port, said valve means being operable to pass fluid through said port and into said chamber and to prevent flow of said fluid through said port from said chamber, and means for creating a pressure differential across said valve means for urging said fluid into said chamber and expanding said chamber, said means for creating a pressure differential including a surface on said expansible chamber means movable relative to a surface on one of said members, said surfaces forming a pumping wedge chamber therebetween and operable upon relative rotation therebetween to provide said pressure differential.

References Cited

UNITED STATES PATENTS

| 2,214,819 | 9/1940 | Kiep et al. | 192—54 XR |
| 635,684 | 10/1899 | Herschmann. | |
| 731,483 | 6/1903 | Matson. | |
| 2,292,988 | 8/1942 | Bloomfield et al. | 192—45 |
| 2,564,841 | 8/1951 | Gravina | 192—35 XR |
| 2,649,175 | 8/1953 | Stripling | 192—35 |
| 2,699,846 | 1/1955 | Pitman et al. | |
| 3,324,744 | 6/1967 | Roper | 192—44 XR |

BENJAMIN W. WYCHE III, *Primary Examiner.*

U.S. Cl. X.R.

192—38, 85, 103; 74—711